United States Patent [19]

Richardson et al.

[11] 4,399,868

[45] Aug. 23, 1983

[54] UNPLUGGING BRINE-SUBMERGED PERFORATIONS

[75] Inventors: Edwin A. Richardson, Houston, Tex.; Walter B. Fair, Jr., Slidell, La.

[73] Assignee: Shell Oil Company, Houston, Tex.

[21] Appl. No.: 307,035

[22] Filed: Sep. 30, 1981

[51] Int. Cl.³ .................... E21B 37/00; E21B 43/25
[52] U.S. Cl. ................................ 166/300; 166/303; 166/304
[58] Field of Search ............... 166/303, 302, 300, 272, 166/304

[56] References Cited

U.S. PATENT DOCUMENTS

| | | | |
|---|---|---|---|
| 2,799,342 | 7/1957 | Fatt | 166/300 X |
| 3,354,958 | 11/1967 | Parker | 166/303 |
| 4,090,562 | 5/1978 | Maly et al. | 166/304 |
| 4,178,993 | 12/1979 | Richardson et al. | 166/300 |
| 4,219,083 | 8/1980 | Richardson et al. | 166/300 |
| 4,232,741 | 11/1980 | Richardson et al. | 166/292 X |

Primary Examiner—Stephen J. Novosad
Assistant Examiner—Thuy M. Bui

[57] ABSTRACT

Fluid passageways between a well borehole and a subterranean reservoir which are both plugged and submerged within relatively dense brine can be contacted with heat and oil solvent by arranging a nitrogen gas generating aqueous solution to be both reactive at the reservoir temperature and denser than the brine in the borehole and flowing alternating slugs of it and a liquid oil solvent into the zone to be treated.

4 Claims, 5 Drawing Figures

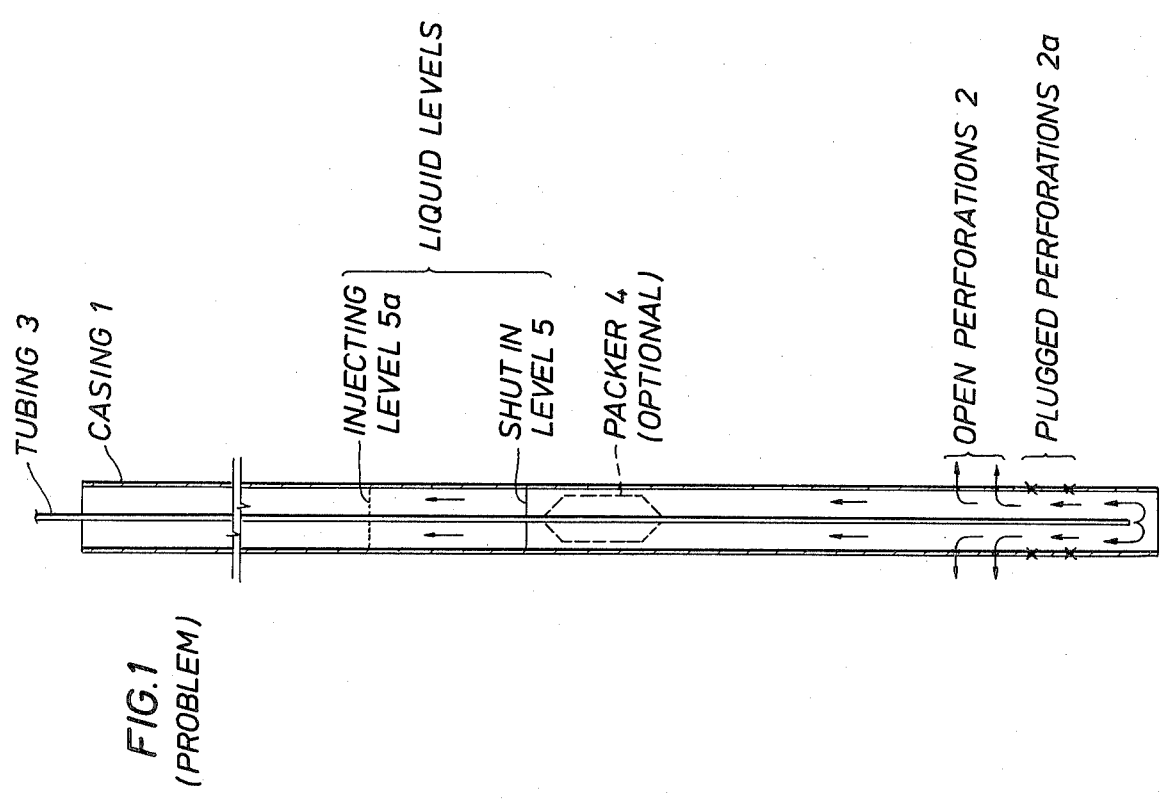

UNPLUGGING BRINE-SUBMERGED PERFORATIONS

BACKGROUND OF THE INVENTION

This invention relates to a well treatment problem of long standing; that of effectively contacting plugged fluid passageways between the borehole and reservoir with heat and oil solvent when those passageways are covered by a column of relatively dense brine.

The solid materials that plug such fluid passageways are usually heat-sensitive and oil-solvent-soluble materials, such as paraffinic and/or asphaltenic solids. But, it has previously been difficult, if not impossible, to contact brine-submerged plugged passageways with either a hot fluid, such as hot water or steam, or an oil solvent, such as an aromatic liquid. When either the hot fluid or oil solvent are piped into the borehole and discharged at a point lower than the plugged passageways they tend to flow upward, within the column of brine, and into the borehole annulus or to flow outward, through the passageways which are not plugged, and into the reservoir, in a manner providing little or no contacting or heating of the plugged passageways.

U.S. patents such as the following have suggested numerous procedures for unplugging such brine-submerged passageways. U.S. Pat. No. 2,228,629 suggests dropping into a well borehole a silk or wool container filled with oil-coated particles of aluminum and flaked caustic soda, so that those materials will react when the fabric container is ruptured within the brine in the borehole. U.S. Pat. No. 2,799,342 suggests injecting an oil solvent dispersion of alkali metal particles (smaller than about 5 microns) into an aqueous liquid within the borehole. U.S. Pat. No. 2,889,884 suggests injecting into the reservoir a non-aqueous solvent solution of metal hydrides which are exothermically reactive with water. U.S. Pat. No. 3,279,514 suggests separately injecting fluids containing an oil solvent, water, and a liquid dispersion of a salt or hydroxide which reacts exothermically with water, so that the fluids mix and react. U.S. Pat. Nos. 3,342,264 and 3,342,265 suggest sequentially injecting compositions containing triglyceride oils (such as lecithin) and aqueous alkali, and then flushing the boreholes with water to remove such passageway plugging materials. U.S. Pat. No. 3,914,132 suggests injecting a solvent mixture of aromatic hydrocarbon and amine as an oil solvent which is capable of dissolving any contacted asphaltenic solids.

In the course of research relating to other well treating problems, it has been found that certain self-reactive aqueous solutions could be compounded and flowed into wells with their components arranged to subsequently react to yield nitrogen gas and heat at times and rates which were useful for various well treating processes. Such discoveries have been described in the following U.S. patents and patent applications.

U.S. Pat. No. 4,178,993 by E. A. Richardson and R. F. Scheuerman describes a process for initiating fluid production from a liquid-containing well by injecting an aqueous solution containing nitrogen-gas-generating reactants having a concentration and rate of reaction correlated with the pressure and volume properties of the reservoir and the well conduits to react at a moderate rate within the well and/or the reservoir to generate enough gas to displace sufficient liquid from the well to reduce the hydrostatic pressure within the well to less than the fluid pressure within the reservoir.

U.S. Pat. No. 4,219,083 by E. A. Richardson and R. F. Scheuerman describes a process for cleaning well casing perforations by injecting an aqueous solution containing nitrogen-gas-generating reactants, an alkaline buffer providing a reaction-retarding pH and an acid-yielding reactant for subsequently overriding the buffer and lowering the pH in order to trigger a fast-rising pulse of heat and pressure which causes a perforation-cleaning backsurge of fluid through the perforations.

U.S. Pat. No. 4,232,741 by E. A. Richardson, R. F. Scheuerman, D. C. Berkshire, J. Reisberg and J. H. Lybarger describes a process for temporarily plugging thief zones within a reservoir by injecting an aqueous solution containing nitrogen-gas-generating reactants, a foaming surfactant, an alkaline buffer and an acid-yielding reactant, arranged so that they initially delay the reaction and subsequently initiate a moderate rate of gas production, in order to form a foam which is, temporarily, relatively immobile within the reservoir formation.

Patent application Ser. No. 127,355 filed Mar. 5, 1980, by D. R. Davies and E. A. Richardson describes a process for conducting a production test by circulating a solution of nitrogen-gas-generating reactants within conduits within a well, with the solution buffered at a pH providing a promptly-initiated reaction having a relatively mild rate and being inflowed through a well conduit at a rate such that the gas being generated serves as a lift-gas for gas-lifting fluid from the reservoir through another well conduit.

Patent application Ser. No. 215,895 filed Dec. 12, 1980, by E. A. Richardson and W. B. Fair, Jr. now U.S. Pat. No. 4,330,037 describes a process for treating an oil-containing reservoir in order to concurrently chemically heat the reservoir and increase its effective permeability to oil by injecting an aqueous solution of nitrogen gas-generating reactants which is arranged to have a volume, a rate of reaction and a heat-generating capability such that the heat-generation will occur below a selected depth and will cause a selected volume of the reservoir to be heated to a selected temperature.

The disclosures of the U.S. Pat. Nos. 4,178,933; 4,219,083 and 4,232,741 and the patent applications Ser. Nos. 127,355 and 215,895 are incorporated herein by cross-reference.

SUMMARY OF THE INVENTION

The present invention relates to a well treating process for bringing heat and oil solvent into contact with fluid passageways between the well borehole and reservoir, inclusive of those which are both plugged and submerged within a relatively dense brine. A heating solution is compounded so that it (a) consists essentially of an aqueous liquid solution of nitrogen-generating reactants arranged for generating heat and gas at a significant but moderate rate at the reservoir temperature and (b) contains enough total dissolved solid to provide a solution density exceeding that of the brine in the borehole. At least one portion each of that heating solution and a liquid oil solvent are flowed into the well at a rate and sequence arranged so that (a) a significant portion of the heating solution sinks into the brine in the borehole and yields heat and gas that contact the plugged passageways and (b) a significant portion of the oil solvent is heated by the chemically generated heat and is displaced into contact with the plugged passageways.

BRIEF DESCRIPTION OF THE DRAWINGS

FIG. 1 is a schematic illustration of downhole portions of a well having a type of plugging problem to which the present invention is directed.

FIG. 2 shows such a well being treated in accordance with the present invention.

DESCRIPTION OF PREFERRED EMBODIMENTS

Figure 3:
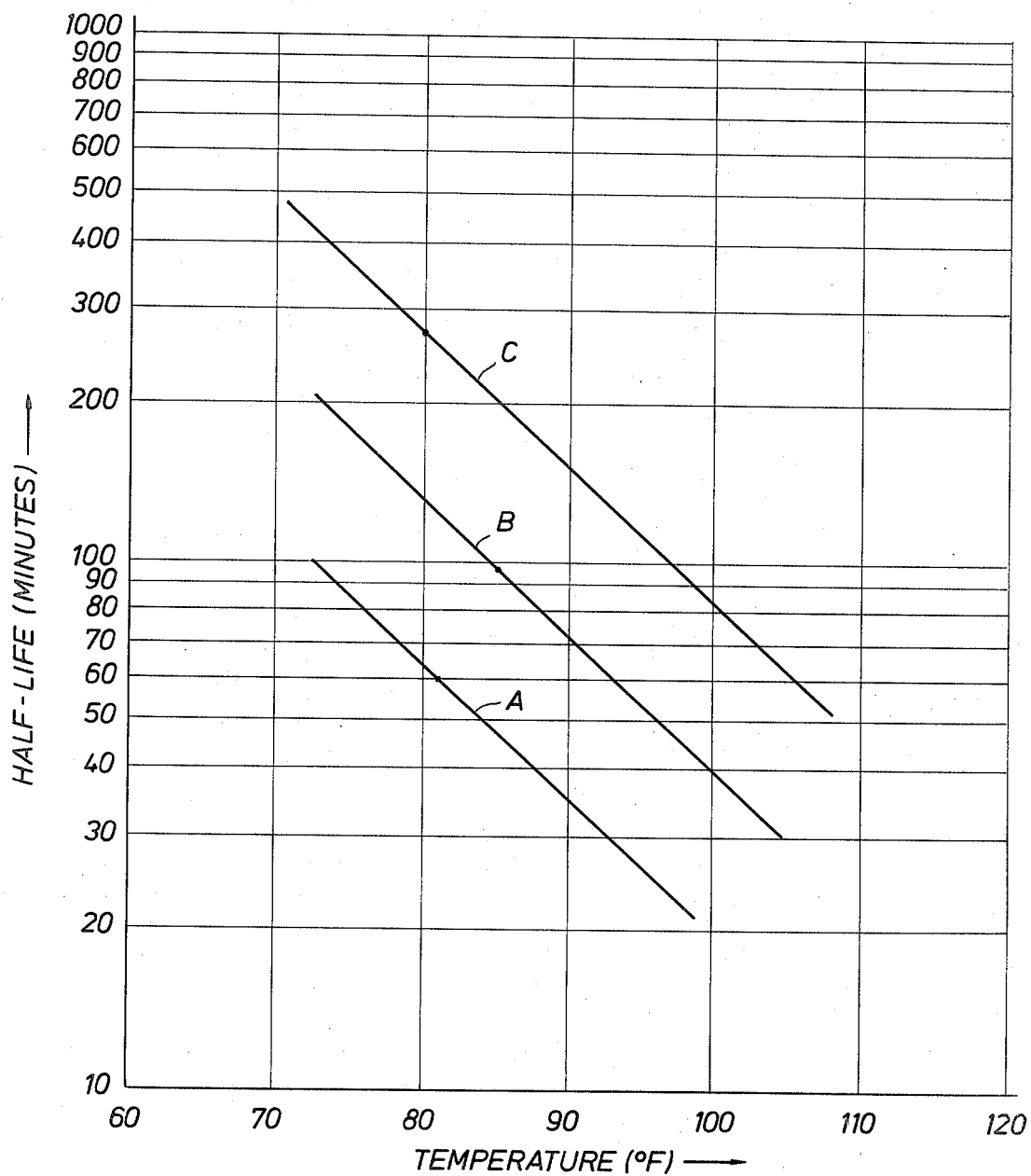
FIG. 3 shows a plot of half-lifes versus time for various nitrogen-gas-generating solutions.

The present invention is, at least in part, premised on a discovery that heating solutions comprising aqueous solutions of nitrogen-gas-generating reactants can be arranged to react at desirable rates while having densities exceeding those of most, if not all, reservoir brines, for use at the temperatures of most, if not all, subterranean reservoirs. And, the so-prepared solutions can be used in conjunction with liquid oil solvents for paraffinic and/or asphaltenic materials in a manner which provides a wide range of effective procedures for unplugging plugged borehole-to-reservoir flow passages which are covered by a column of brine within the borehole of a well.

FIG. 1 illustrates a typical well situation involving such a problem. It shows a lower portion of a casing string 1 which has been cemented into a borehole and perforated along a subterranean reservoir interval. Along that interval the upper perforations 2 provide open passageways between the borehole and the reservoir while the lower perforations 2a are plugged. A tubing string 3 extends to a depth below the lowermost perforations. Such tubing string can optionally be provided with a packer 4 (illustrated by dashed lines) and/or may contain a pumping means with valves which can be operated from the surface.

In the illustrated situation, the borehole contains an open tubing string surrounded by an open annular passageway between the tubing and casing. Those conduits tend to be filled with reservoir brine to a static or shut-in level 5, providing a hydrostatic head equalling the reservoir fluid pressure. When fluid is injected through a tubing string 3, the injected fluid tends to rise above the point of injection as shown by arrows. When the fluid level in the annulus has increased to an "injecting fluid level" 5a, the fluid pressure within the borehole exceeds the reservoir fluid pressure and the fluid being injected flows into the reservoir through the open perforations 2.

Experience has shown that, in such a situation, if an oil solvent such as xylene is injected through the tubing 3, the path it follows is dominated by its having a density lighter than that of the brine in the borehole. The first injected portions tend to bypass the plugged perforations and rise in the annulus until an "injecting fluid level" 5a is attained by the increasing height of a column of solvent floating above the brine. After that, the additional portions of injected solvent continue to bypass the plugged perforations 2a as they flow into the reservoir through the open perforations 2.

If a heating fluid such as steam or hot water is injected, the result tends to be the same or similar. The steam tends to run up the borehole to a position above the column of brine in the annulus and any hot water which is injected, or formed by the condensation of the steam, tends to bypass the plugged perforations and flow into the annulus and/or reservoir (through the open perforations).

If a packer, such as packer 4, is arranged to close the annulus, any solvent or hot aqueous fluid inflowed through tubing 3 tends to simply bypass the plugged perforations 2a and flow into the reservoir through the open perforations 2. And, a similar result is obtained if the tubing contains a valve to prevent an upflow of fluid and the solvent or hot fluid is injected through the annulus.

FIG. 2 illustrates a treatment of such a well by injecting into the tubing string a sequence of slugs of, for example, solvent, heating solution, and, optionally, foaming solution. The solvent tends to displace some brine through the open perforations and into a reservoir zone such as zone 6 ahead of solvent zone 7 while at the same time most of the solvent is rising above the column of brine within the borehole to form a column of solvent, 7a, above a column of brine, 6a, in the borehole annulus. Since the heating solution is a nitrogen-gas-generating solution having a density greater than the brine in the borehole, when it flows out of the injection tubing 3, it sinks below the brine in the borehole, displaces some brine into a reservoir zone such as 6b and occupies the heating solution zones 8 and 8a, which are adjacent to the plugged and open perforations in the reservoir and borehole. The plugged passageways are heated and, at least to some extent, are scrubbed by the rising and expanding bubbles of nitrogen gas.

If the last slug of heating solution is followed by a trailing slug of foaming solution (comprising a nitrogen-gas-generating solution containing a foaming surfactant, for example, as described in the cross-referenced U.S. Pat. No. 4,178,993) some, or all of the liquid in the tubing string is converted to a liquid phase of a foam. Then, by allowing a subsequent outflow of fluids through the tubing string with the annulus closed, the plugged passageways are further scrubbed by heated fluid which flows into the heated bottom of the borehole from the reservoir and annulus.

In general, the present process causes some, if not all, of the plugging materials to be thermally mobilized and/or decomposed by heat and dissolved and/or entrained in an agitated mixture of oil solvent and brine. The resulting solution or dispersion of the plugging materials in aqueous or oleaginous liquids can, of course, be removed from the borehole by returning the well to production.

HYPOTHETICAL WELL TREATMENT

Particularly where it is necessary or desirable that no packer or valve be used to facilitate an inflow of fluid into the well and/or through the open perforations and into the reservoir, the present process can advantageously be conducted as a batchwise treatment. For example, consider the following situation. The well to be treated contains a 7-inch casing which is perforated into a reservoir which is located at a depth of about 4700 feet and has a bottomhole temperature of 155° F. The well contains a $2\frac{7}{8}$ inch outer diameter tubing string having a fluid capacity of about 0.0058 barrels per foot and contains a sucker rod pump from which the rods have been removed. The well contains no packer or other equipment which would be damaged by temperatures of above about 500° F. The well casing contains some open and some plugged perforations within a reservoir interval of about 20 feet which is covered by a reservoir brine having a density of about 9.3 lbs. per gallon.

The reservoir pressure is from about 300 to 400 psig, with a fracturing pressure of about 1300 psig, and the reservoir brine has a density of 9.3 lbs. per gallon. This causes a static fluid level within the well to be a column of brine in the borehole extending above the perforations for about 500 to 1000 feet and containing a volume of from about 20 to 30 barrels of fluid.

For treating such a well by the present process, a well heating solution can be prepared by compounding each 100-barrel portion in 50-barrel batches which are mixed in accordance with the following instructions:

| Solution A (50 bbl) | |
|---|---|
| Fresh water (0.42 bbl/bbl) | 42 bbl. |
| Sodium Nitrite (75 lb/bbl; 3 M/L) | 7500 lbs. |
| Solution B (50 bbl) | |
| Fresh water (0.33 bbl/bbl) | 33 bbl. |
| Ammonium Nitrate (91 lb/bbl; 3 M/L) | 9100 lbs. |
| Sodium Acetate (6.1 lb/bbl; 0/2 M/L) | 610 lbs. |
| Citric Acid (0.33 lb/bbl; 0.00435 M/L) | 33 lbs. |
| Inhibitor (A-186, or equivalent) (0.11 gal/bbl) | 11 gal. |
| Hydrochloric Acid (37%) | 1.5 gal. |
| Mixing Instructions | |
| Solution A: | Place 40 bbl. fresh water in tank. Add 7500 lb. Sodium Nitrite. Add fresh water to yield 50 bbls. Mix thoroughly to dissolve. |
| Solution B: | Place 30 bbls fresh water in tank. Add 9100 lbs Ammonium Nitrate. Mix thoroughly to dissolve. Circulate through 5 micron dual Pico filters a minimum of 4 volumes or until clear. Add 610 lbs. sodium acetate, 33 lbs. citric acid, 11 gal. inhibitor, and 1.5 gal. 37% HCl. Add fresh water to yield 50 bbls. Mix thoroughly to dissolve. |

The so-prepared heating solution will have a density of about 10.5 lbs. per gallon, for the fresh solution (prior to its reaction) and about 9.7 lbs. per gallon, for the spent solution (after it has reacted).

A pumping arrangement such as that provided by a cementing truck with two displacement tanks can be used to combine and inflow the solutions A and B, for example, in the form of 20-barrel batches of fluid which are quickly spotted at the bottom of the well. Each such inflow (preferably through the tubing string) will cause the level of fluid in the borehole to rise to a fluid injecting level of about 800 feet, which provides a bottomhole injection pressure of about 400 psi. Within a few minutes after such a batch of heating solution has been spotted in the 155° F. reservoir temperature zone, the reacting solution will begin to boil, when it has reached a temperature of about 440° F. The spotting of a similar size batch of an oil solvent such as xylene in the tubing string will cause it to flow through the hot tubing and casing strings and contact the boiling and effervescing heating solution in the borehole and reservoir. After a convenient period of say, one hour, a second stage treatment heating fluid and, if desired, additional solvent, can be injected. Two to three cycles of heating and solvent injecting would probably be sufficient.

If desired, the fluids in the tubing and annular conduits could be "rocked," by alternately closing the annulus and tubing string so that, in succession, a gas pressure will build up above the column of fluid in the closed conduit and will displace liquid downward toward the reservoir interval and reservoir.

In any case, the resulting solution and/or dispersion (of materials which have been removed from the plugged passageways and dissolved or dispersed in hot oil solvent or water) can be removed from the well by re-installing the pump sucker rods and initiating the pumping of the well.

LABORATORY DATA

FIG. 3 shows plots of the half-lifes versus temperature for three solutions containing interreacting ammonium ions and nitrite ions. In each case the reactants were dissolved in distilled water, in the concentrations indicated below. About 100 cc portions of the solutions were maintained isothermally at the indicated temperatures in a water bath capable of removing the reaction-generated heat substantially as soon as it formed and thus maintaining the solutions at the indicated temperature (i.e, providing substantially isothermal conditions).

Each of the solutions contained 3 moles per liter sodium nitrite, 3 moles per liter ammonium nitrate, 0.2 moles per liter sodium acetate, 0.00435 moles per liter citric acid. The solutions differed only in the amounts of HCl added in order to provide the indicated pH's. The amounts of HCl and pHs of those solutions were:

Curve A, 0.1 m HCl at pH 4.75;
Curve B, 0.05 m HCl at pH 5.13;
Curve C, 0.025 m HCl at pH 5.3

Figure 4:
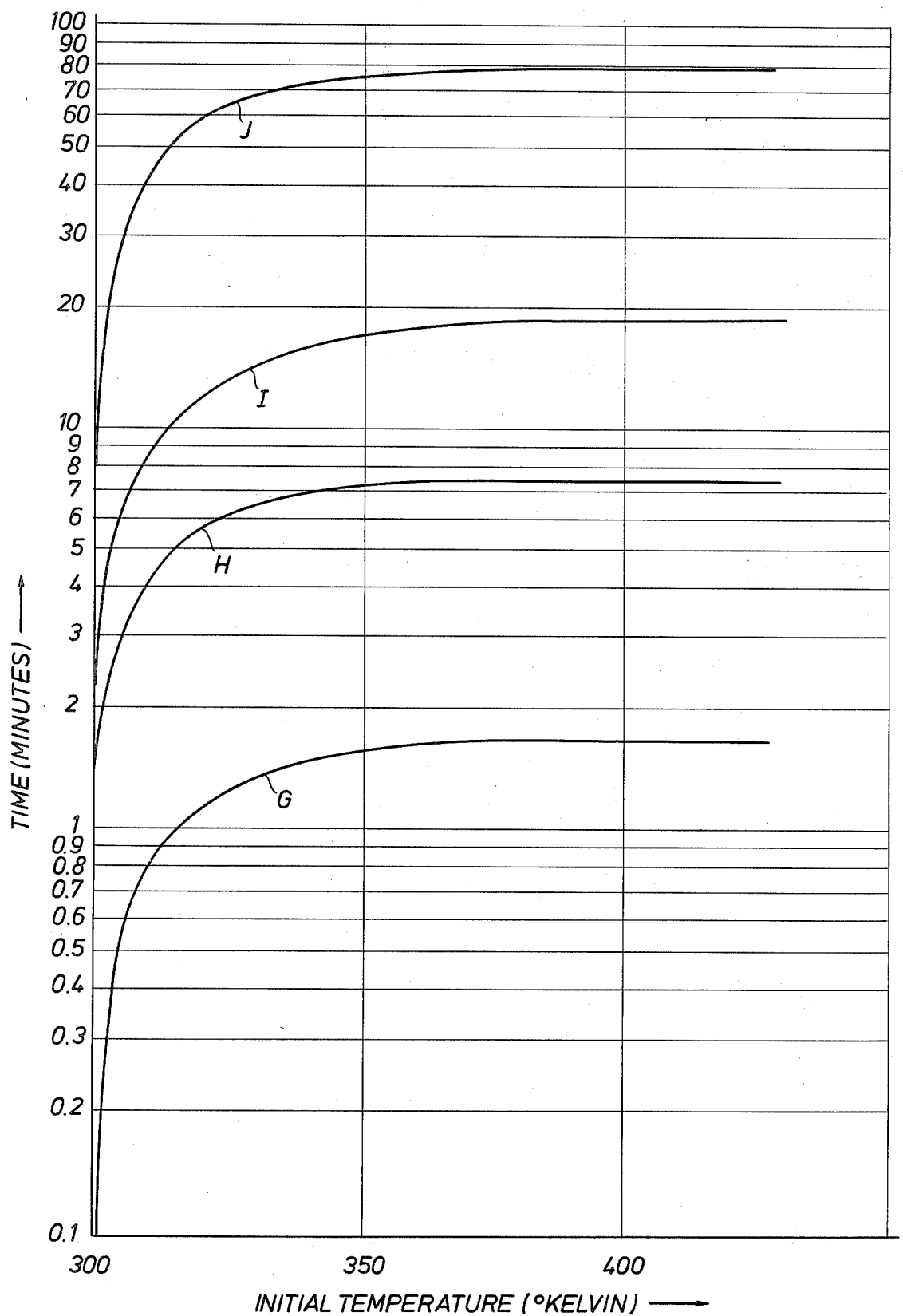
FIG. 4 shows a plot of the heat generated with time by nitrogen-gas-generating solutions reacting in an adiabatic environment.

FIG. 4 shows plots of the amounts by which a one-liter solution was heated while being maintained adiabatically (for example, in a thermos bottle) at an initial temperature of 300° Kelvin (25° C. or 81° F.) versus time in minutes. Each of the solutions represented by the curves G, H, I, J contained (in moles per liter of distilled water): 3 m sodium nitrite; 3 m ammonium nitrate; 0.2 m sodium acetate; 0.00435 m citric acid; and the indicated amount of HCl to provide the indicated initial pH.

Such solutions generate substantial 70,000 calories per mole of reacting ammonium and nitrite ions, or per mole of gaseous nitrogen generated. Therefore, the maximum amount of heat generated by the reactants in each of the solutions would increase the temperature of 1 liter of water by 210° Kelvin or centigrade or 410° F.—which would cause the maximum temperature attainable by each solution to be 510° K., 237° C. or 491° F.

The curve G solution contained 0.1 m HCl and had a pH of 4.73. As indicated in the figure, the reaction of that solution was completed in about 1.7 minutes.

The curve H solution contained 0.5 m HCl and had a pH of 5.13.

The curve I solution contained 0.25 m HCl and had a pH of 5.3.

The curve J solution contained no HCl and had a pH of 5.9.

If the present type of heating solutions are employed in a well in which most of the heat is conducted away from the fluid (thus providing substantially isothermal conditions) the rates of reaction and heat generation will be similar to those of FIG. 3. However, where the well does not remove a significant amount of the generated heat (thus providing substantially adiabatic conditions) the relationships of FIG. 4 are applicable. In general, in a given well, the situation can be expected to be somewhere between those extremes. Where it is desirable to rather precisely position the depth at which the heat generation is to occur (for example to avoid damaging packers or other heat sensitive equipment in the borehole) conventional logging means and/or analyses of prior well performance can be utilized to determine suitable rates of fluid inflow and the probable heat loss, in order to properly select the reaction rate to use for the heat-generating reaction and the rate at which the reactant-containing solution is pumped into the well.

Figure 5:
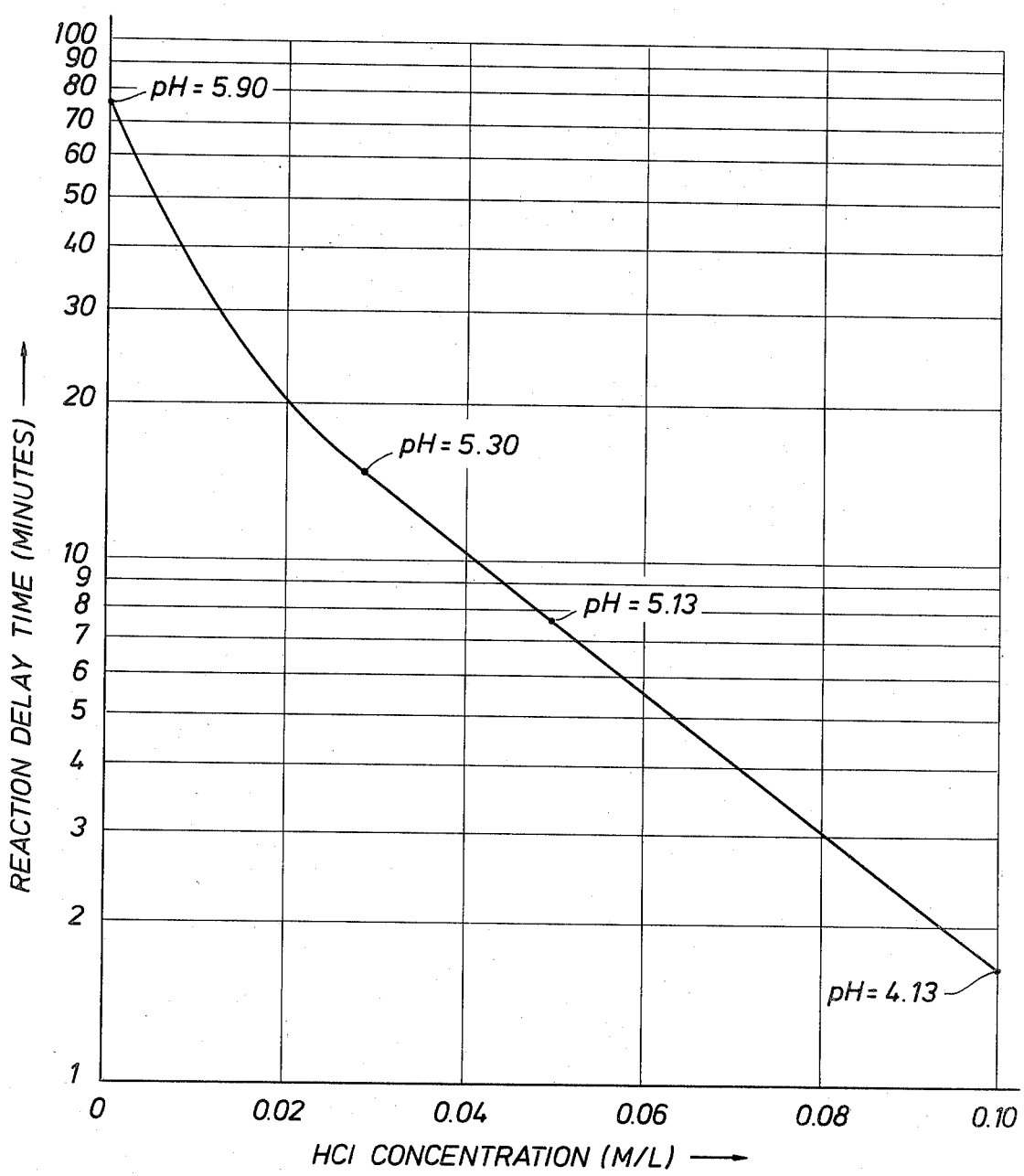
FIG. 5 shows a plot of the relation between hydrochloric acid concentration and amount of delay time of nitrogen-gas-generating solutions.

FIG. 5 shows a graph of how a reaction delay time decreases with increase in concentration of HCl. Such a reaction delay time relates to how long it takes for a relatively rapid rise in temperature to occur within a treating solution of the present invention while the solution is kept within a container having a relatively low heat loss. The data in FIG. 5 relates to an aqueous solution which contained (in terms of moles per liter, M/L) 3 M/L of each of ammonium nitrate and sodium nitrite, 0.2 M/L sodium acetate, 0.00435 M/L citric acid, the indicated amounts of HCl, and had an initial temperature of 80° F. Such data can be used to formulate such a treating solution or to confirm the capability of a solution compounded at a well site to delay the onset of the chemical heating until the solution had flowed down through the well to a selected depth, such as a depth below that of a heat-sensitive element.

SUITABLE COMPOSITIONS AND PROCEDURES

Suitable nitrogen-containing gas-forming reactants for use in the present process can comprise water-soluble amino nitrogen-containing compounds which contain at least one nitrogen atom to which at least one hydrogen atom is attached and are capable of reacting with an oxidizing agent to yield nitrogen gas within an aqueous medium. Such water-soluble nitrogen-containing compounds can include ammonium salts of organic or inorganic acids, amines, and/or nitrogen-linked hydrocarbon-radical substituted homologs of such compounds, as long as they react with an oxidizing agent to produce nitrogen gas and byproducts which are liquid or dissolve in water to form liquids which are substantially inert relative to the well conduits and reservoir formations. Examples of such nitrogen-containing compounds include ammonium chloride, ammonium nitrate, ammonium nitrite, ammonium acetate, ammonium formate, ethylene diamine, formamide, acetamide, urea, benzyl urea, butyl urea, hydrazine, phenylhydrazine, phenylhydrazine hydrochloride, and the like. Such ammonium salts, e.g., ammonium chloride, ammonium formate or ammonium nitrate are particularly suitable.

Oxidizing agents suitable for use in the present process can comprise substantially any water-soluble oxidizing agents capable of reacting with a water-soluble nitrogen-containing compound of the type described above to produce nitrogen gas and the indicated types of by-products. Examples of such oxidizing agents include alkali metal hypochlorites (which can, of course, be formed by injecting chlorine gas into a stream of alkaline liquid being injected into the well), alkali metal or ammonium salts of nitrous acid such as sodium or potassium or ammonium nitrite, and the like. The alkali metal or ammonium nitrites are particularly suitable for use with nitrogen-containing compounds such as the ammonium salts. Since the reaction can occur between ammonium ions and nitrite ions, ammonium nitrite is uniquely capable of providing both the nitrogen-containing and oxidizing reactants in a single compound that is very soluble in water.

Aqueous liquids suitable for use in the present invention can comprise substantially any in which the salt content does not (e.g. by a common ion effect) prevent the dissolving of the desired proportions of N-containing and oxidizing reactants. In general, any relatively soft fresh water or brine can be used. Such aqueous liquid solutions preferably have a dissolved salt content of less than about 1000 ppm monovalent salts and less than about 100 ppm multivalent salts.

Alkaline buffer compounds or systems suitable for initially retarding the rate of gas generation can comprise substantially any water-soluble buffer which is compatible with the gas-forming components and their products and tends to maintain the pH of an aqueous solution at a value of at least about 7. Examples of suitable buffering materials include the alkali metal and ammonium salts of acids such as carbonic, formic, acetic, citric, and the like, acids. For relatively high pHs such as 8 or more (e.g. for use at higher temperatures) the weak acid portions of such systems can include the salts of amines or amino-substituted compounds such as ethylenediamemetetraacetic acid (EDTA), triethanolamine (TEA), glycine (aminoethanoic acid), aniline, and the like.

In general, it is desirable to use relatively concentrated and fast-reacting nitrogen-generating components such as at least about 3 moles per liter of each of ammonium nitrate and sodium nitrite. Those solutions usually contain enough dissolved solids to provide an aqueous solution density exceeding that of the reservoir brine. However, if for example, it is desirable to use less concentrated reactants in order to limit the amount of heat to be generated or to delay the onset of heat generation to avoid heating above a particular depth in the well, or the like, relatively inert solids, such as alkali metal or alkaline earth metal salts of strong acids, can be added to provide a selected relatively high solution density with the smaller proportion of reactants. Particularly suitable salts for such a use are the sodium and potassium chlorides.

The oil solvents to be used can comprise substantially any liquid organic compounds which are solvents for paraffinic and/or asphaltenic oils or petroleum type compounds which are likely to be plugging deposits to be removed. Aromatic solvents such as benzene, xylene and the like and/or diesel oil or the like hydrocarbon fractions containing aromatic hydrocarbons are particularly suitable solvents.

As will be apparent to those skilled in the art, the concentrations at which the individual amino nitrogen-containing and oxidizing agent-containing solutions can be combined to form the nitrogen-gas-generating solution, can be varied to suit the solubility properties of the compounds containing those ions and the proportions in which such solutions are to be combined. For example, if the nitrogen-containing compound is the least soluble compound, it can be dissolved at a molarity less than twice the molarity selected for the treating solution and then mixed, in a greater than equal proportion, with a smaller than equal proportion of a more concentrated solution of the more soluble compound, in order to combine the reactants in stoichiometric proportion. Of course, in various situations, a less than stoichiometric molecular proportion of the less soluble reactant can be combined with an excess of the more soluble reactant.

The rate at which a nitrogen-gas-generating heating solution is injected into the well can be continuous or intermittent or can be varied substantially as desired as long as the rate of injection is correlated with the rate of the reaction within the heating solution, in the manner described above. For example: a first portion of the heating solution can be injected and stopped in order to heat up a selected portion of the well or reservoir; and/or the concentration of the reactants, and/or rate at which the reactants react, can be varied in order to impart more or less heat at a selected location within the well or reservoir; or the like.

In general, the determinations of the currently existing properties such as the temperature or volume or injectivity of the well and reservoir to be treated can be conducted or ascertained by logging or measuring procedures such as those currently available and/or by previous experience in the same or an adjacent well. The temperatures provided by the present heating procedure at a particular downhole location can be monitored during the treatment by means of conventional tools and, at least to some extent, such temperatures can be varied by varying the rate at which the nitrogen-gas-generating solution is injected.

What is claimed is:

1. A well treating process, for bringing heat and oil solvent into contact with plugged fluid passageways which extend between the borehole and reservoir and are covered by a column of relatively dense brine, comprising:
    compounding a self-reactive heating solution which (a) consists essentially of an aqueous liquid solution of nitrogen-generating reactants arranged for yielding heat and gas at a significant but moderate rate at the reservoir temperature and (b) contains enough total dissolved solids to provide a solution density exceeding that of the brine in the borehole;
    flowing at least one slug each of said heating solution and a liquid oil solvent which becomes a hot liquid solvent for petroleum type compounds at the temperature yielded by the heating solution into the well at a flow rate and sequence such that (a) a significant portion of the heating solution sinks into the column of brine in the borehole and reacts to yield heat and gas that contact the plugged fluid passageways and (b) a significant portion of the oil solvent is heated by the reaction and is displaced into contact with the plugged passageways; and
    removing the resulting solution or dispersion of plugging materials in aqueous or oleaginous liquid by producing fluid from the well.

2. The process of claim 1 in which (a) an alternating sequence of portions of the heating solution and the liquid oil solvent are flowed into the borehole at a substantially constant rate of fluid flow through a conduit from which those fluids are discharged at a depth below the plugged fluid passageways and (b) the reaction rate of the nitrogen-gas-generating reactants is arranged to become relatively rapid but not excessive at the temperature initially encountered within the borehole at the depth of the reservoir.

3. The process of claim 1 in which a foaming or emulsifying surfactant is dissolved or dispersed in at least one portion of heating solution or liquid organic solvent which is flowed into the well.

4. The process of claim 1 in which (a) a slug of aqueous solution containing nitrogen-gas-generating reactants having a reaction rate which is arranged to become rapid but not excessive at the surface temperature at the well site is flowed into the well as substantially the trailing portion of inflowed nitrogen-gas-generating solution and (b) the movement of fluid within the conduit through which said trailing portion of solution is flowed is controlled so that fluid ahead of it is displaced into the borehole by the pressure of gas generated by it and accumulated above it.

* * * * *